United States Patent
De Vos

[11] Patent Number: 5,899,971
[45] Date of Patent: May 4, 1999

[54] COMPUTER UNIT FOR SPEECH RECOGNITION AND METHOD FOR COMPUTER-SUPPORTED IMAGING OF A DIGITALIZED VOICE SIGNAL ONTO PHONEMES

[75] Inventor: Luc De Vos, Munich, Germany

[73] Assignee: Siemens Aktiengesellschaft, Munich, Germany

[21] Appl. No.: 08/820,561

[22] Filed: Mar. 19, 1997

[30] Foreign Application Priority Data

Mar. 19, 1996 [DE] Germany ............................ 196 10 848

[51] Int. Cl.⁶ ................................. G10L 5/06; G10L 9/00
[52] U.S. Cl. .......................... 704/231; 704/236; 704/243; 704/275
[58] Field of Search ..................... 704/231, 236, 704/243, 275

[56] References Cited

U.S. PATENT DOCUMENTS

| | | | |
|---|---|---|---|
| 4,624,010 | 11/1986 | Takebayashi | 704/231 |
| 4,723,290 | 2/1988 | Watanabe | 704/243 |
| 4,736,429 | 4/1988 | Niyada | 704/243 |
| 5,349,645 | 9/1994 | Zhao | 704/243 |
| 5,349,687 | 9/1994 | Ehlig | 704/231 |
| 5,457,770 | 10/1995 | Miyazawa . | |

FOREIGN PATENT DOCUMENTS

4031421 A1 4/1991 Germany .

OTHER PUBLICATIONS

"DVC306 Advanced Voice Command Processor," DSPC Product Overview—Advance Information by DSP Communications, Inc., Cupertino, CA Sep. 1995, 4 pages.

Ruske, G. "Spezielle Algorithmen der Spracherkennung," in *Automatische Spracherkennung*, Oldenbourg Verlag, 2, 1992, pp. 172–195.

Zünkler, K. "Methoden des Sprachmustervergleichs," in *Spracherkennung mit Hidden–Markov Modellen unter Nutzung von unterscheidungsrelevanten Merkmalen*, Dissertation at the Technical University of Munich, 1991, pp. 22–25.

*Primary Examiner*—David R. Hudspeth
*Assistant Examiner*—Robert Louis Sax
*Attorney, Agent, or Firm*—Hill & Simpson

[57] ABSTRACT

Speech recognition with a speaker-independent speech recognition method is possible for voice signals newly added by a user using the computer unit. Imaging of the voice signal onto stored phoneme feature vectors is implemented for each voice signal to be newly incorporated. A number of possibilities of imaging are compared to one another and the best phoneme representation of the imaging is employed as phoneme presentation for the new word. The voice signal is then stored in a user memory with the phoneme presentation.

9 Claims, 6 Drawing Sheets

| Ak \ t | p<br>A1 | p-1<br>A2 | p-2<br>A3 | p-3<br>•••A4 | ••• | p-k+1<br>Ak | ••• | 0<br>Ap |
|---|---|---|---|---|---|---|---|---|
| WA |  |  |  | Ft |  | ••• |  |  |
| ST1 | Fb–b | p | d | t | ••• |  | ••• |  |
| ST2 | Fp–p | b | t | t | ••• |  | ••• |  |
| ST3 | d | b | p | t | ••• |  | ••• |  |
| ⋮ | ⋮ | ⋮ | ⋮ | ⋮ | ••• |  | ••• |  |
| STj | a | b | ai | i | ••• |  | ••• |  |
| ⋮ | ⋮ | ⋮ | ⋮ | ⋮ | ••• |  | ••• |  |
| STI | ai | a | t | t | ••• |  | ••• |  |
| WE |  |  |  |  |  |  |  |  |

COMPUTER UNIT FOR SPEECH RECOGNITION AND METHOD FOR COMPUTER-SUPPORTED IMAGING OF A DIGITALIZED VOICE SIGNAL ONTO PHONEMES

BACKGROUND OF THE INVENTION

The present invention is generally related to the field of speech recognition. Two fundamentally different approaches for recognizing spoken language have been previously known in the field of speech recognition. A first principle is based on speaker independent speech recognition. A vocabulary composed exclusively of fabricationally defined individual words is thereby employed in the speech recognition. A computer unit for speech recognition that is based on this principle as well as the corresponding method for speaker-independent speech recognition are generally known from, for example, G. Ruske, *Automatische Spracherkennung*, Oldenbourg Verlag, 2nd ed., ISBN 3-48622794-7, pp. 172–195, 1992. This approach is based, for example, on a phoneme recognition, combined with a hidden markov modeling. First, feature vectors are derived from a digitalized voice signal dictated by a user. These feature vectors continue the information of the voice signal that is important for the speech recognition. The identified feature vectors are subsequently compared to prototype feature vectors typical of the phoneme segments. These prototype feature vectors may be stored, for example, in ROM (Read-Only-Memory) provided for this purpose.

Since only one memory location for the phonetic presentation of this word is provided for each word of the vocabulary to be recognized, the total memory requirement for the speaker-independent speech recognition is mainly defined by the memory capacity of the ROM. The results of the aforementioned comparison operations are then combined with one another in a search to determine the spoken word with highest probability from the predetermined vocabulary. In this approach, the vocabulary must be stored with the prototype feature vectors in the form of phonemes of the respective language. Due to the nature of speaker-independent speech recognition based on a phoneme recognition, the recognition of a user-defined part of the vocabulary can only be realized given the pre-condition of the availability of a phonetic notation of each word to be incorporated into the vocabulary that is input by the users.

For this reason, this approach harbors the disadvantage that an additional outlay is established for the user in the phonetic presentation of each user-defined part of the vocabulary. This also leads to ergonomic disadvantages of this approach.

Further, the considerable costs of an additionally required human-machined interface in the form of a keyboard is considered a substantial disadvantage of this approach. Due to the necessity that the user himself must implement the division of the respective new work into phonemes, this approach is also very susceptible to error.

A second approach is based on speaker-dependent speech recognition. This approach is based on a whole-word comparison between a dictated, digitalized voice signal and speech seminars (templates) dictated during a training phase and stored for speaker-dependent speech recognition. One means for the implementation of speaker-dependent speech recognition, as well as an example of this approach, is known from K. Zütnkler, *Spracherkennung mit Hidden-Markov Modellen unter Nutzung von unterscheidungsrelevanten Markmalen*, Dissertation Technical University München, pp. 22–25, 1991.

A considerable disadvantage of this approach may be seen in the necessity of static storage of the stored speech samples (templates). A training phase is required to be repeated over and over again at the beginning of each "speech recognition session" that cannot be imputed to a user. The requirement for static RAM memory space caused as a result thereof is proportional to the plurality of stored templates per vocabulary word, to the plurality of user-defined vocabulary words, and to the plurality of users for whom the speaker-dependent speech recognition must be capable of being operated at the same time. Beginning with a certain value combination for the aforementioned parameters, not only does the memory capacity of the static memory become greater than given a means with speaker-independent speech recognition, but an increase in the dissipated power that impedes power-saving operation is additionally caused due to the static storing.

A further disadvantage of this approach may be seen in the considerable manufacturing costs that, in particular, are incurred because of the unfavorable area relationships of a static RAM memory to a ROM memory.

It is also known from an article entitled "Product Overview—Advance Information, DVC Advanced Voice Command Processor," in DSP Communications, Inc., Cupertino, Calif., 1995, to implement the algorithms for speaker-independent speech recognition and for speaker dependent speech recognition on a plurality of chips. This known computer unit comprises a special processor bearing the type designation DVC 306, a micro controller and a plurality of memory chips having a total of up to 16 megabits of S-RAM capacity.

This known computer unit for speech recognition has a number of considerable disadvantages. Due to the employment of both the algorithms for speaker-independent speech recognition as well as the algorithms for speaker-dependent speech recognition, a plurality of algorithms must be implemented in a ROM memory.

Further, the disadvantages of the speaker-dependent algorithms, for example, the high speed for static RAM memory and the substantial costs of manufacturing connected therewith, are still present in this implementation.

What is referred to as a Viterbi algorithm is also known from G. Ruske, *Automatische Spracherkennung*, Oldenbourg Verlag, 2nd ed., ISBN 3-48622794-7, pp. 172–195, 1992. Also, the method of dynamic programming (FP algorithm) is likewise known from G. Ruske, *Automatische Spracherkennung*, Oldenbourg Verlag, 2nd ed., ISBN 3-48622794-7, pp. 172–195, 1992.

SUMMARY OF THE INVENTION

The present invention is thus based on the problem of creating a computer unit for speech recognition that avoids the aforementioned disadvantages. The invention is also based on the problem of specifying a method wherein speech recognition is possible with which the aforementioned disadvantages of known methods are avoided. A computer unit and a method for computer-supported imaging of a digital signal onto phonemes are, therefore, provided to overcome the problems associated with known systems.

To this end, in an embodiment of the present invention, a computer unit for speech recognition is provided. The computer unit has means for speaker-independent speech recognition. A phoneme set memory stores phoneme feature vectors and/or phonemes that comprise an arbitrary plurality of segments whereby the phoneme feature vectors respectively characterize the phoneme. A user memory stores phoneme sequences of digitalized words and/or of digitalized words that were spoken into the computer unit by a user wherein the phoneme sequences are determined by a means for comparing user feature vectors to the stored phoneme feature vectors. Further, means is provided for comparing user feature vectors of a part of a digitalized voice signal to characterize the part of the digitalized voice signal to the stored phoneme feature vectors.

In an embodiment, at least two components selected from the group including the means for speaker-independent speech recognition, the phoneme set memory, the user memory and the means for comparing user features vectors are formulated on one chip.

In another embodiment of the present invention, a method is provided for computer-supported imaging of a digitalized voice signal onto phonemes that have an arbitrary plurality of segments and to which a phoneme feature vector is respectively allocated that characterizes the respective phoneme or phoneme segment wherein the digitalized voice signal is divided into an arbitrary plurality of digital voice signal parts and further wherein for each voice signal part for a prescribable plurality of voice signal parts, the method comprises the steps of: determining a user feature that characterizes the voice signal part for the voice signal part; determining a similarity value of the user feature vector to the respective phoneme feature vector from a comparison of the user feature vector to at least an arbitrary plurality of phoneme feature vectors storing the similarity values; and determining a sequence of phonemes for the digitalized voice signal with which the digitalized voice signal is described on the basis of the similarity values.

In an embodiment, the comparison is additionally implemented with stored speech feature vectors that are prescribed by a user wherein the speech feature vectors respectively characterize a part of the digitalized word.

In an embodiment, the similarity value is respectively formed upon employment of the method of dynamic programming.

In an embodiment, the similarity value is respectively employed upon employment of the Viterbi method.

In an embodiment, the following steps are provided in the determination of the sequence of phonemes for the digitalized voice signal: storing at least two similarity values per digital voice signal part; determining a sequence of similarity values that refer to the same phoneme, and evaluation quantity for at least two voice signal parts; and selecting the phonemes whose evaluation quantity comprises a maximum value from the voice signal parts.

In an embodiment, the respective length of an interconnected sequence of a respective phoneme is taken into consideration in the sequence of similarity values in the determination of the evaluation quantities.

In an embodiment, only sequences of similarity values of a phoneme whose length is greater than a prescribable barrier are taken into consideration.

In an embodiment, a word start and/or a word end for the digitalized voice signal is provided.

In an embodiment, the voice signal part with a maximum similarity value is employed as a first voice signal part that describes a word start.

In an embodiment, the digital voice signal parts overlap.

In addition to a means for speaker-independent speech recognition, and at least a memory for storing phoneme feature vectors, a means for comparing user feature vectors of a part of a digitalized voice signal that characterize the part of the digitalized signal to stored phoneme feature vectors is provided in the computer unit for speech recognition. Due to the imaging of digitalized voice signals that are spoken by a user onto feature vectors of phonemes that are already stored, it is possible to exclusively employ the approach of speaker-independent speech recognition.

An algorithm for speaker-dependent speech recognition is no longer stored in a ROM memory given this computer unit. As a result thereof, a substantial savings ROM memory requirement is achieved.

Further, the substantial disadvantage of the very high RAM memory requirement given speaker-dependent approaches is avoided since words newly dictated by the user are imaged onto phonemes that are already stored, and the representation of the new word is stored in the form of known phonemes. This substantial reduction of RAM memory requirement also leads to a considerable cost reduction in the manufacture of the computer unit. A significant reduction of required dissipated power in the implementation of the speech recognition is also enabled by the computer unit of the present invention.

In an embodiment, the digitalized voice signal newly dictated by a user is divided into an arbitrary plurality of voice signal parts. A respective feature vector is then determined for a prescribable plurality of voice signal parts. This respective feature vector is then compared to the stored phoneme feature vectors. A similarity value is respectively defined from the comparison. This indicates the similarity of the voice signal part with the respectively compared phoneme feature vector. The similarity values are respectively stored and, with reference to the similarity values, a sequence of phonemes for the digitalized voice signal is identified in a last step. The digitalized voice signal is now described by this sequence and can be stored in a phoneme presentation.

This procedure makes it possible to apply a speaker-independent algorithm to new words that are actually speaker-dependent given a reduced requirement for memory space. The advantages of the method of the present invention are to be particularly seen in the advantages of the realization of the cost-beneficial computer unit that thereby becomes possible.

The method of the present invention also makes it possible to also process terms from a foreign language with phonemes that are not yet stored in the phoneme set memory with a very good recognition rate.

In an embodiment, the development of the computer unit makes it possible to realize at least two of the components or all of the components as well in common with one chip. This results in a substantial reduction of the costs for manufacturing the computer unit.

In an embodiment, the results of a speech recognition are improved more since it is not only stored phoneme feature vectors but also speech feature vectors previously dictated by the user that are taken into consideration for the comparison formation of the feature vectors.

In an embodiment, a very simple, but nonetheless exact, determination of the sequence of phonemes for the digitalized voice signal is achieved. The implementation of the method of the present invention can thus be very quickly implemented for the computer unit.

In an embodiment, the method avoids, by taking the length of an interconnected sequence of a phoneme in a sequence of similarity values into consideration, random hits in the speech recognition caused by sequences of similarity values that are too short, or respectively, plosives that are not recognized due to sequences of similarity values that are too long.

In an embodiment, the need for calculating time is further reduced by the development of the method since unnecessary noise is not taken into consideration in the form of voice signal parts in the implementation of the method by detecting the word start or, respectively, the word end. As a result thereof, the number of required voice signal parts and, thus, the number of required comparisons are reduced. Further, the error susceptibility of the method of the present invention is substantially reduced.

In an embodiment, a further reduction in the error susceptibility of the method of the present invention is achieved by the development of the method whereby the digital voice signal parts can respectively overlap. As a result of the redundancy of the information of the voice signal deriving therefrom, the result of the method is further "secured."

Further, it is an advantageous property of the method of the present invention that, by acquiring similarity values, an implicit evaluation of the distance of the digitalized voice signal in the feature space from a word in the feature space that has already been stored can be identified. This makes it possible that the storing of words whose phoneme representation in the feature space lies too close to words already is not allowed in order to thus avoid an increasing error susceptibility in the speech recognition due to words lying too close to one another in the feature space.

Due to implying only one type of evaluation quantity both for the feature vectors already stored as well as for the user-defined feature vectors, it becomes possible to compare the results of the speaker-dependent and of the independent methods to one another.

Another positive property of the method of the present invention may be seen therein that the vocabularies for speaker-independent voice recognition can be mixed with the new words spoken by the user.

Additional features and advantages of the present invention are described in, and will be apparent from, the detailed description of the presently preferred embodiments and from the drawings.

DETAILED DESCRIPTION OF THE PRESENTLY PREFERRED EMBODIMENTS

Figure 1:
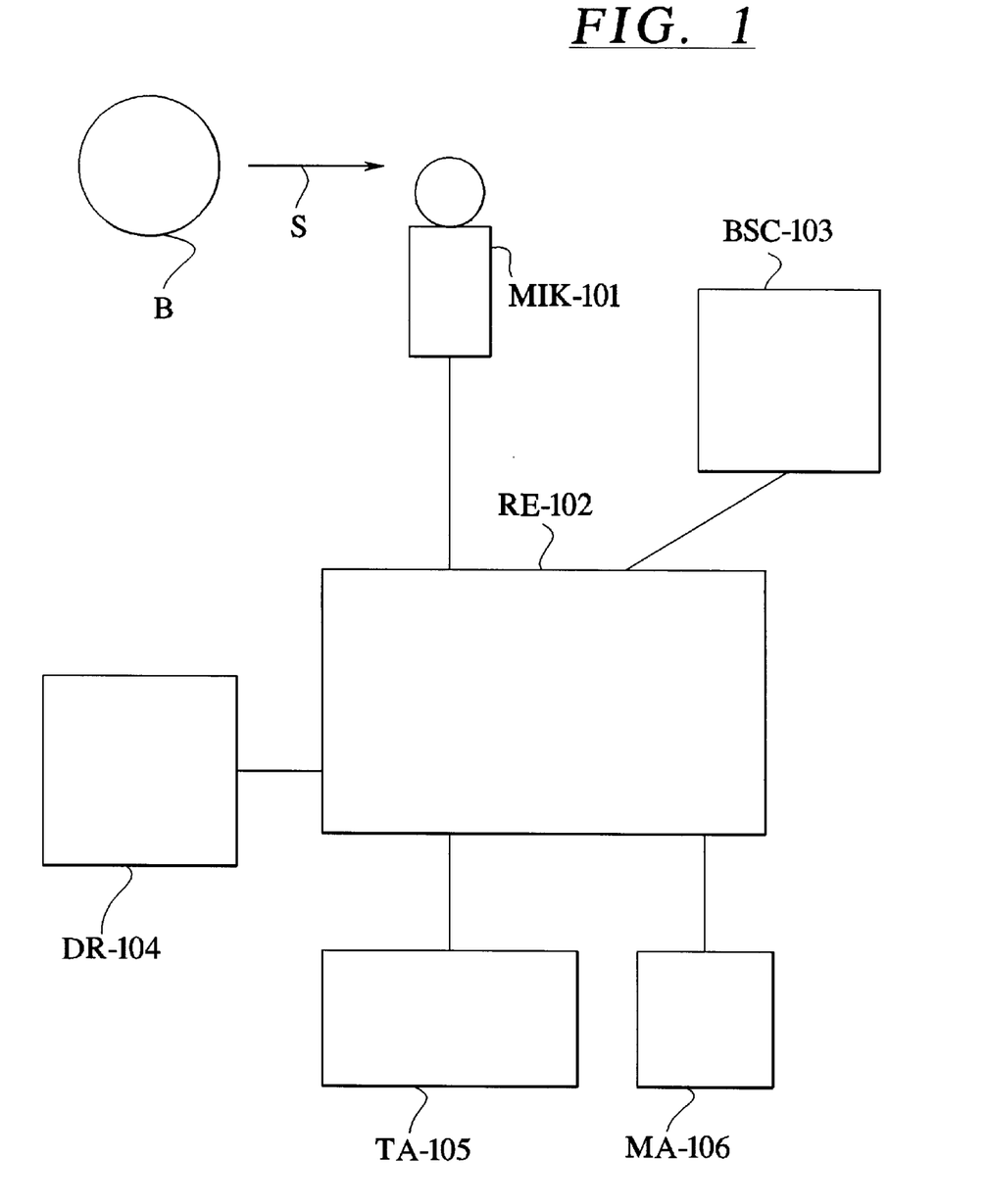
FIG. 1 is a black box diagram of an arrangement with which the acceptance of speech signals of a user by a computer is shown.

FIG. 1 shows a user B who speaks a voice signal S capitalized into a microphone MIK 101. The microphone MIK 101 is coupled to a computer unit RE 102 for speech recognition. The spoken voice signal S is digitalized in the computer unit RE 102 and is further processed according to the method of the present invention. The method for speech recognition, further, is implemented in the computer unit RE 102 whose structure is explained later.

The computer unit RE 102 is also coupled to a picture screen BSC 103 and/or a printer DR 104 and/or to some other arbitrary output unit with which the user B is shown the results of the method. Further, a keyboard TA 105 and/or a mouse MA 106 is provided in this arrangement for inputting data.

Figure 2A:
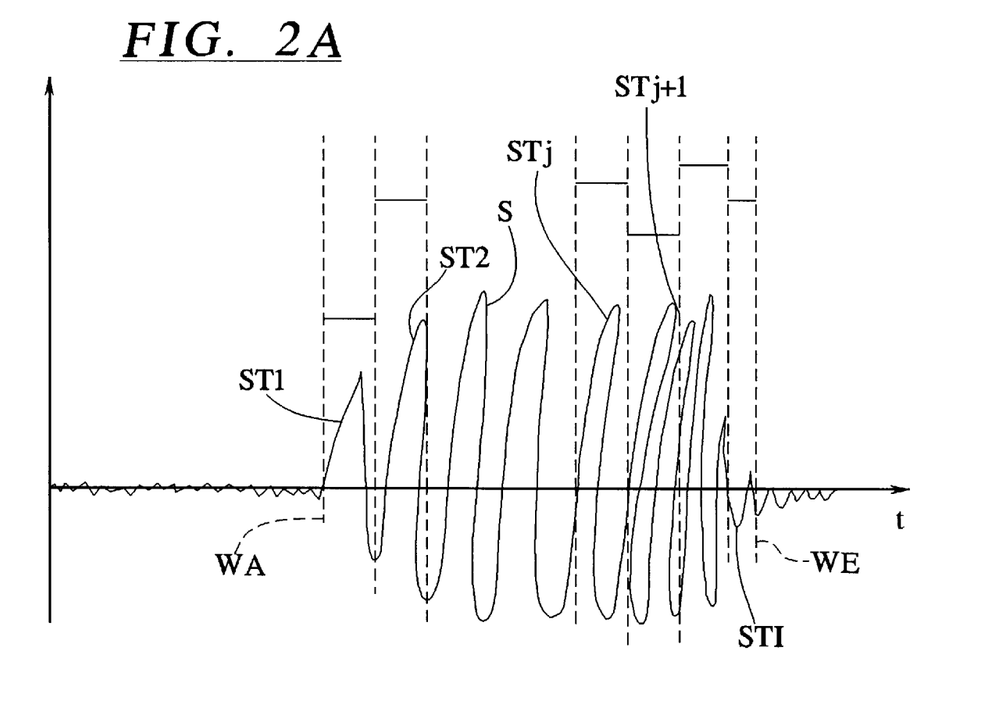
FIGS. 2A and 2B illustrate a graph of a speech signal in the time domain with the individual voice signal parts (FIG. 2A) as well as the overlapping voice signal parts (FIG. 2B).
Figure 2B:
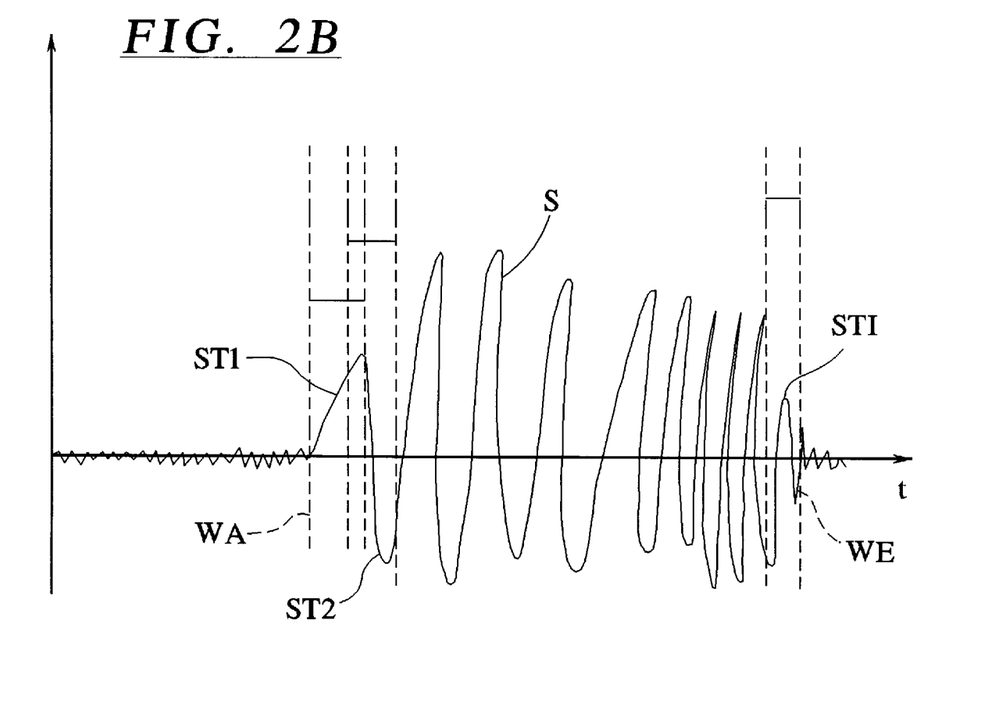

FIGS. 2A and 2B respectively show the digitalized voice signal S over a time t. For simplifying a further explanation, but not to be construed as limiting, it is assumed that the voice signal S is present in the form of a word having a word start WA and a word end WE.

As shown in FIG. 2A, the voice signal S is divided into individual voice signal parts STj whereby a first index j respectively unambiguously identifies the voice signal part STj and is a natural number between 1 and I whereby I indicates the plurality of voice signal parts STj.

As shown in FIG. 2B, it is provided in the development of the method of the present invention that the individual voice signal parts STj overlap, as will be further explained below.

Figure 3:
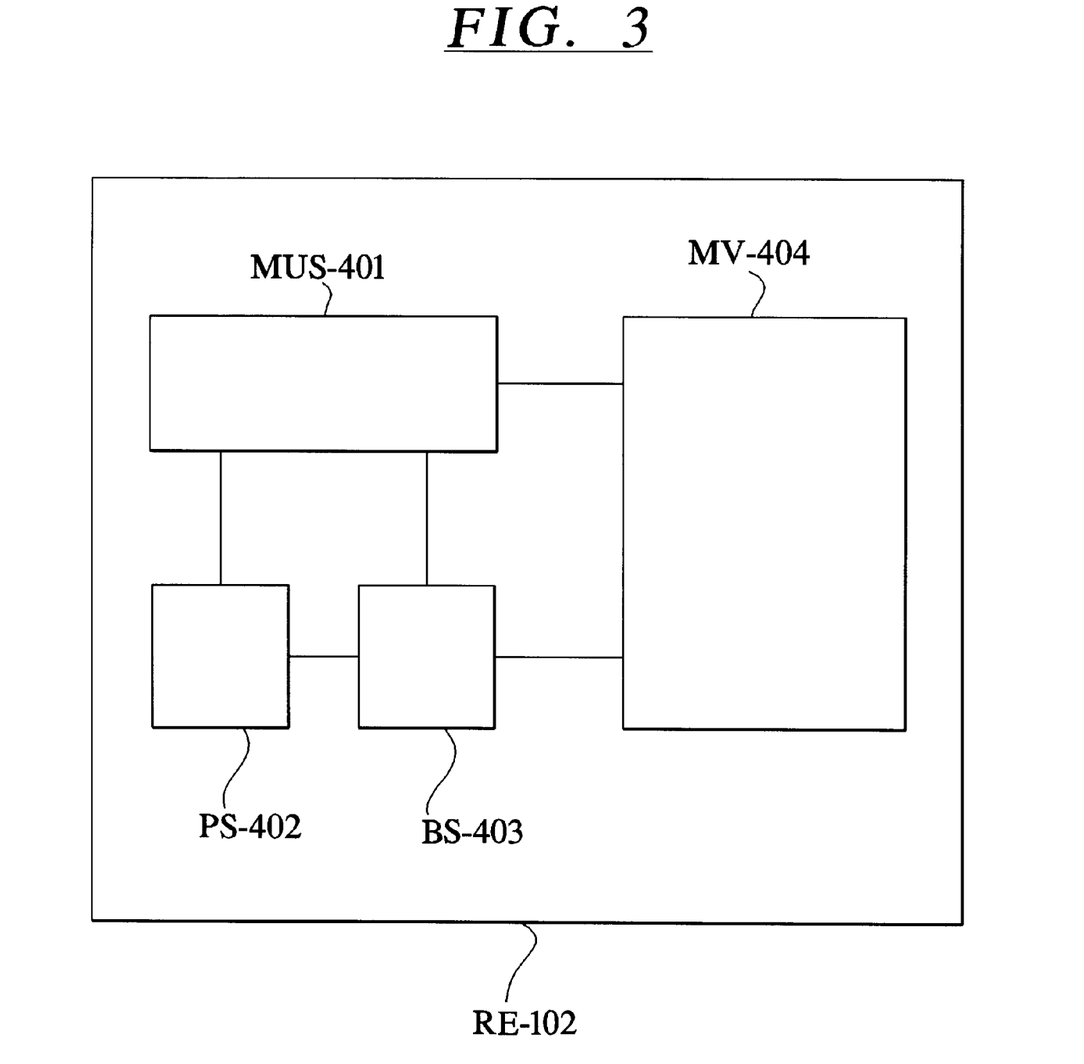
FIG. 3 illustrates a black box diagram of an embodiment of a computer unit for speech recognition.

The computer unit RE 102 of the present invention is shown in FIG. 3. The computer unit RE 102 includes at least the following components: a means MUS 401 for speaker-independent speech recognition; a phoneme memory PS 402; a user memory BS 403; and a means MV 404 for comparing user feature vectors of a voice signal part STj to phoneme feature vectors stored in the phoneme set memory PS 402.

A method for speaker-independent speech recognition that is generally known from G. Ruske, *Automatische Spracherkennung,* Oldenbourg Verlag, 2nd ed., ISBN 3-48622794-7, pp. 172–195, 1992 is implemented with the means MUS for speaker-independent speech recognition.

Of course, a person skilled in the art is familiar with other methods for speaker-independent speech recognition. Such methods can be implemented without further explanation in the means MUS 401 for speaker-independent speech recognition.

Fabricationally determined individual words in the form of what is referred to as phoneme presentation are stored in the phoneme set memory PS 402. Further, the individual phonemes of the language employed are stored in the phoneme set memory PS 402 together with phoneme feature vectors allocated to the phonemes.

The digitalized voice signal S spoken by he user B and already processed with the method of the present invention is stored in the user memory BS 403 in the form of individual words that are in turn present in a phoneme presentation. Further, phoneme sequences for the individual voice signals S spoken by the user and already "processed" can be stored in the user memory BS 403.

The individual feature vectors, the phoneme feature vectors or the user feature vectors contain the information of the respective voice signal S important for the speech recognition.

The method of the present invention, which is described below, is implemented in the means MV for comparing user feature vectors of the respective voice signal part STj of the digitalized voice signal S to the phoneme feature vectors and/or speech feature vectors of digital words already "processed" and stored in the user memory as shown in FIG. 3.

Figure 4:
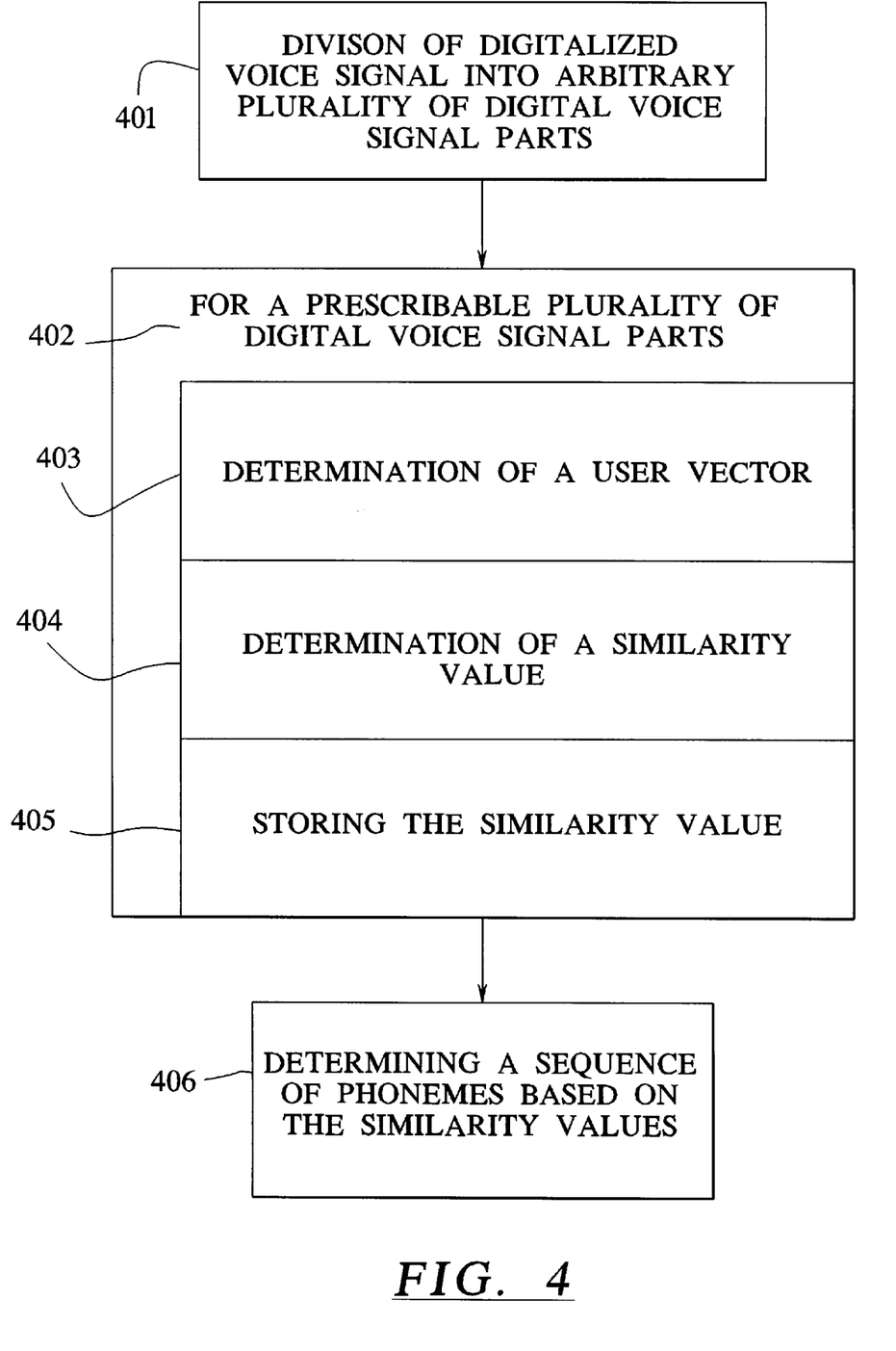
FIG. 4 illustrates a flowchart of an embodiment of the method in terms of its individual method steps.

The method of the present invention is shown in terms of its individual method steps in the form of a flowchart in FIG.

4. In a first step 401, the voice signal S spoken by the user B, which is digitalized by the computer RE, is divided at step 401 into an arbitrary plurality of voice signals STj.

Respectively, following steps for determining a similarity value for the respective voice signal part STj to stored phoneme feature vectors, a step 402 is respectively implemented for a prescribable plurality of voice signal parts STj.

A user feature vector that comprises information relevant to the speech recognition is determined at step 403 for each voice signal part STj of the prescribable plurality of voice signal parts STj.

The user feature vector is now compared to an arbitrary plurality of stored phoneme feature vectors that characterize the individual stored phonemes. The comparison can be implemented in a great variety of ways whereby a simple example is set forth in greater detail below. A similarity value Ak is respectively determined at step 404 by the comparison for each pair of user feature vector and phoneme feature vector. The similarity value Ak is respectively stored at step 405.

The result of this procedure is that a respective similarity value Ak that describes the similarity of the user feature vector to the phoneme feature vector and, thus, the similarity of the voice signal part STj to the phonemes taken into consideration is respectively available for the user feature vectors that were compared to corresponding phoneme feature vectors for the prescribable plurality of voice signal parts STj.

A sequence of phonemes for the digital voice signal S is determined in a last step 406 on the basis of the similarity values Ak. The spoken, digital voice signal S is described with this sequence of phonemes.

The digital voice signal S is now stored in this phoneme presentation in the user memory as a new word of the vocabulary. In a development of the method of the present invention, the appertaining speech feature vectors are also stored in addition to the phoneme presentation of the digital voice signal S.

The division at step 401 of the digital voice signal into voice signal parts STj can ensue, for example, either by dividing the voice signal S into an arbitrary plurality of voice signal parts STj that do not mutually overlap or, in a development of the method of the present invention, it can be provided that the individual voice signals parts STj mutually overlap. The time curve of the voice signal S is involved better in the recognition due to the overlap of the individual voice signal parts STj.

Figure 5:
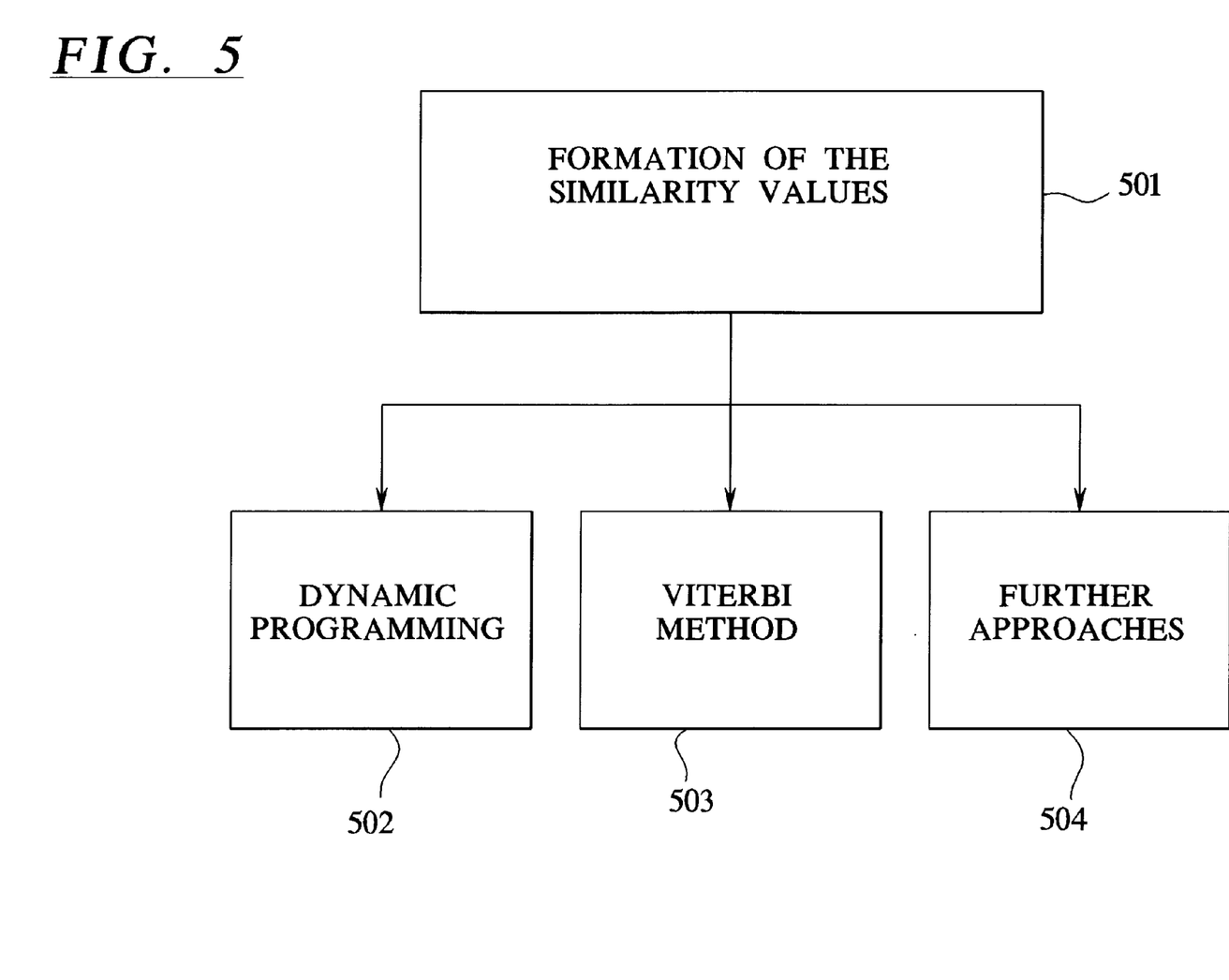
FIG. 5 illustrates a block diagram of an embodiment of a plurality of alternatives for forming the similarity values in the comparison of the user feature vectors to stored phoneme feature vectors.

The similarity value Ak can be determined in a variety of ways, as shown in FIG. 5. The similarity value Ak, for example, can be respectively formed at 501 by any of the following: what is referred to as the algorithm of dynamic programming as shown by 502 and taught by G. Ruske; by the Viterbi algorithm as shown at 503 and taught by G. Ruske; or further approaches with which a person skilled in the art is familiar, as generally shown at 504.

A distance quantity AG from which the similarity value Ak is formed can, for example, be determined according to one of the two following rules:

$$AG = \sum_{i=1}^{n} (a_i - b_i)^m,$$

whereby
  i references a first index for unambiguous identification of the components of the feature vectors;
  n references a plurality of components of the feature vectors;
  $a_i$ respectively references a component of the user feature vector; and
  $b_i$ respectively references a component of the phoneme feature vector and/or of the speech feature vector; or $$AG = \sum_{i=1}^{n} |a_i - b_i|^m,$$

whereby
  i references a first index for unambiguous identification of the components of the feature vectors;
  n references a plurality of components of the feature vectors;
  $a_i$ respectively references a component of the user feature vector; and
  $b_i$ respectively references a component of the phoneme feature vector and/or of the speech feature vector.

A person skilled in the art is familiar with further methods of forming the distance quantity AG, and these can be employed without limitation in the method of the present invention.

The formation of the similarity Ak ensues in a way with which a person skilled in the art is familiar. The similarity value Ak indicates an omission probability corresponding to the phoneme.

The formation of the similarity value Ak only forms the purpose of specifying a criterion for the distance of the user feature from the phoneme feature vector or from the speech feature vector in the feature space.

A simple example for the formation of the sequence of phonemes for the digital voice signal S on the basis of a similarity value Ak that only serves the purpose of simple explanation is now described below. This simple procedure, however, is not to be understood as limiting to the present invention. Modifications or, respectively, methods that fundamentally achieve the same goal, namely identifying a sequence of phonemes on the basis of the similarity values Ak on the basis whereof the digital voice signal S is optimally correctly approached, can be utilized in this method in a way with which a person skilled in the art is familiar.

Further, it must be emphasized that the phoneme feature vector need not directly refer to an entire phoneme; rather, it is also provided that the phoneme is divided into an arbitrary plurality of segments, for example, into a starting segment, into what is referred to as a "steady-state segment," as well as into an end segment of the respective phoneme. Fundamentally, however, the plurality of feature vectors for the corresponding phoneme are arbitrary and are only dependent on, on the one hand, the computer capacity available and, on the other hand, on the desired precision of the speech recognition. It is also provided in a development of the method that a plurality of phoneme feature vectors be stored and be precessed for each phoneme or phoneme segment. A modeling of various pronunciations of a word thereby becomes possible.

Further explanation, however, is based for simplification on respective phoneme feature vectors that characterize a phoneme as a whole in a first version.

Figure 6:
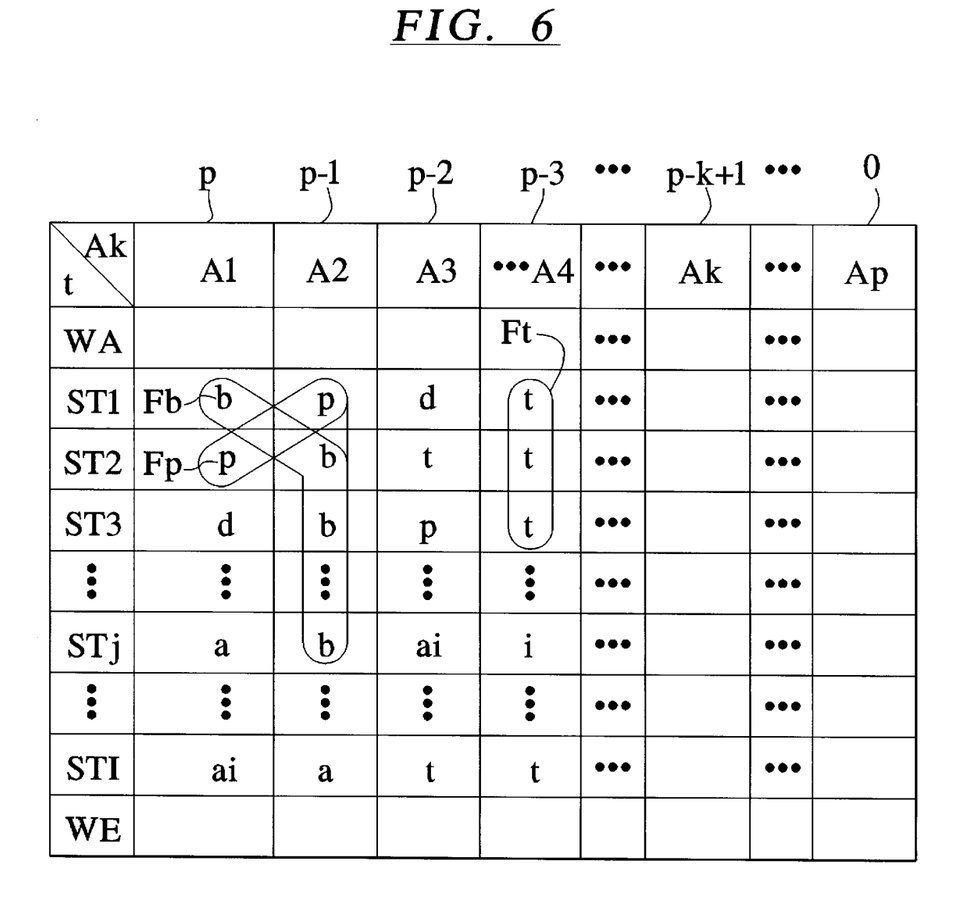
FIG. 6 illustrates a table of an example for determining a sequence of phonemes on the basis of similarity values.

In the form of a table, FIG. 6 shows the voice signal parts STj beginning with the word start WA of the voice signal S up to the word end WE of the voice signal w in individual rows of the table. Various identified similarity values Ak are shown in the individual columns of the table for the respective voice signal part STj whereby a similarity index k represents an arbitrary number between 1 and p and unambiguously identified each similarity value Ak. The individual similarity values Ak thus respectively describe the similarity of the voice signal part STj with the respectively compared phoneme feature vector.

For illustrating the method, the phoneme to which the respective voice signal part STj was compared is directly shown in this table in the respective column for the similarity value Ak. Assume in this case for further illustration that the sequence of the illustrated phonemes for each voices signal part STj is ordered according to descending similarity values Ak. The phoneme whose phoneme feature vector coincides best with the respective voice signal STj with respect to the rule employed for forming the similarity value Ak respectively resides in the left-hand column of the table.

An arbitrary weighting is then allocated to the individual "recognized" phonemes according to their "hit probability" that corresponds to the sequence of the similarity values Ak from left to right in the table. This can be comprised therein, for example, that an extremely high weighting value, for example a natural number p that corresponds to the plurality of similarity values Ak taken into consideration, is allocated to the respectively "most similar" phoneme with the first similarity value A1. Correspondingly, for example, the weighting p−1 is allocated to a second similarity value A2. This principle is continued to the $p^{th}$ similarity value Ap to which the value 0 is allocated. In this table, for example, the weighting p is allocated in a first voice signal part ST1 to the phoneme b recognized with the first similarity value A1.

Interconnected sequences of identical phonemes Fb, Fp, Ft are now determined in this table. For example, these can be found for the phoneme b proceeding from the first voice signal part ST1 up to the $j^{th}$ voice signal part STj. This sequence is reference Fb. A further sequence of identical phonemes Ft is determined, for 25 example, for the phoneme p in a further sequence of identical phonemes referenced Fp.

An evaluation quantity of the sequence is now respectively determined for the individual sequences, for example by sum formation of the individual weightings of the phonemes in the individual-voice signal parts STj. Deriving for the sequence Fb of the phoneme b in this case, for example is: Fb=p+p−1+p−1+p−1=4p−3. The deriving for the sequence Ft for the phoneme t in this case is: Ft=3p−8.

The compilation of the sequence of the phonemes on the basis of the similarity values Ak ensues, for example, in that the maximum evaluation quantities are respectively determined and, taking the corresponding voice signal parts STj into consideration, the individual, identified phonemes are joined to one another therefrom with a suitable selection method. This joining yields the corresponding voice signal S in phoneme presentation.

For making this procedure more sophisticated, it is provided in a development of the method to take the length of the respective sequence of the phonemes into consideration in the overall determination of the sequence of phonemes for the digital voice signal S. One advantage of taking the length of the respective sequence of the individual phonemes into consideration can be seen therein that too short of a sequence makes a classification of random accidental hits possible. These hits not being intended in any way whatsoever. Too long a sequence, however, can, for example, lead thereto that some classes of consonants can no longer be reliably detected.

Ideally, these extreme cases should be combined to form a compromise. For example, this compromise can be comprised therein that the sum of the individual weightings is normed to the length of the respective sequence of a phoneme. This thus yields a weighting per voice signal part STj.

Given a length of the sequence Fb of 4, 4p−3/4 then derives for the sequence Fb for the phoneme b. The weighting per voice signal part STj is accordingly employed as an evaluation quantity in this example. The fundamental procedure is the same for that case wherein the phoneme feature vectors do not describe an entire phoneme but only individual segments of a phoneme and, accordingly, the voice signal parts STj also respectively only characterize phoneme feature vectors that are part of a phoneme with their user feature vectors.

Different possibilities of occupying the time span between the word start WA and the word end WE with phonemes or phoneme segments are also provided in versions of the method of the present invention. For example, the word start WA can be identified by a means for word detection. It is also provided in a version of the method to employ that voice signal part STj as a word start WA whose weighting is a maximum per window or whose weighting is a maximum.

It is also provided in a development of the method for determining the phoneme sequence to also form this over a prescribable plurality of potentially existing gaps in the voice signal parts STj. As a result of this development, the method exhibits enhanced ruggedness, and thus, a lower error susceptibility.

It should be understood that various changes and modifications to the presently preferred embodiments described herein will be apparent to those skilled in the art. Such changes and modifications may be made without departing from the spirit and scope of the present invention and without diminishing its attendant advantages. It is, therefore, intended that such changes and modifications be covered by the appended claims.

I claim:

1. A method for computer-supported imaging of a digitalized voice signal onto phonemes that have an arbitrary plurality of segments and to which a phoneme feature vector is respectively allocated that characterizes the respective phoneme wherein the digitalized voice signal is divided into an arbitrary plurality of digital voice signals and further wherein for each voice signal part for a prescribable plurality of voice signal parts, implementing same for each voice signal part, the method comprising the steps of:

determining a user feature vector that characterizes the voice signal part for each of the plurality of voice signal parts;

determining, for each user feature vector, a similarity value of the user feature vector to the respective phoneme feature vector from a comparison of the user feature vector to at least an arbitrary plurality of phoneme feature vectors;

storing the similarity values;

determining a similarity index representing an arbitrary number which is $\geq 1$;

determining a plurality of similarity values per digital voice signal part based on the similarity index;

storing the plurality of similarity values per digital voice signal part;

determining a sequence of similarity values which refer to the same phoneme;

determining an evaluation quantity for the sequence of similarity values; and selecting the phonemes whose evaluation quantity includes a maximum value from the voice signal parts.

2. The method according to claim 1 wherein the comparison is additionally implemented with stored speech vectors that are prescribed by a user wherein the speech feature vectors respectively characterize a part of the digitalized word.

3. The method according to claim 1 wherein the similarity value is respectively formed upon employment of the method of dynamic programming.

4. The method according to claim 1 wherein the similarity value is respectively employed upon employment of the Viterbi method.

5. The method according to claim 1 wherein the respective length of an interconnected sequence of a respective phoneme is taken into consideration in the sequence of similarity values in the determination of the evaluation quantities.

6. The method according to claim 5 wherein only sequences of similarity values of a phoneme whose length is greater than a prescribable barrier are taken into consideration.

7. The method according to claim 1 further comprising the step of:

detecting a word start and/or a word end for the digitalized voice signal.

8. The method according to claim 5 wherein the voice signal part with maximum security value is employed as a first voice signal part that describes a word start.

9. The method according to claim 1 wherein the digital voice signal parts overlap.

* * * * *